(12) United States Patent
Planeta et al.

(10) Patent No.: US 6,413,346 B1
(45) Date of Patent: *Jul. 2, 2002

(54) PRODUCTION OF STRETCH PLASTIC FILM

(75) Inventors: Mirek Planeta; Harinder Tamber, both of Mississauga; Herbert Lam, Richmond Hill, all of (CA)

(73) Assignee: Macro Engineering & Technology Inc., Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/551,989

(22) Filed: Apr. 17, 2000

Related U.S. Application Data

(63) Continuation-in-part of application No. 09/083,353, filed on May 18, 1998, now Pat. No. 6,162,318.

(51) Int. Cl.$^7$ .......................... B29C 47/26; B32B 31/20
(52) U.S. Cl. .................... 156/229; 156/244.27
(58) Field of Search .................... 156/224.27, 308.2, 156/309.6, 229; 264/209.3; 526/348.1; 428/213, 215, 516, 910

(56) References Cited

U.S. PATENT DOCUMENTS

| | | | | |
|---|---|---|---|---|
| 4,189,288 A | | 2/1980 | Halter | 425/72 R |
| 4,277,594 A | * | 7/1981 | Matthews et al. | 526/362 |
| 4,863,770 A | | 9/1989 | Knox | 428/35.7 |
| 5,407,732 A | | 4/1995 | Dokurno | 428/213 |
| 5,458,841 A | | 10/1995 | Shirrell | 264/230 |
| 6,162,318 A | * | 12/2000 | Planeta et al. | 156/224.27 |

* cited by examiner

Primary Examiner—D. Lawrence
(74) Attorney, Agent, or Firm—Robert F. Delbridge

(57) ABSTRACT

Stretch plastic film is formed by extruding suitable plastic material from an annular die as a tubular film, forming the extruded film into a bubble with air entrapped therein by collapsing the tubular film at a predetermined distance from the annular die, causing the temperature of the tubular film when collapsed to be sufficiently high to cause opposite sides of the collapsed film to become bonded together to form a blocked two layer film, and stretching the blocked two layer film to reduce its thickness.

5 Claims, 1 Drawing Sheet

PRODUCTION OF STRETCH PLASTIC FILM

RELATED APPLICATION

This application is a Continuation-in-Part of U.S. patent application Ser. No. 09/083,353 filed May 18, 1998, now U.S. Pat. No. 6,162,318 issued Dec. 19, 2000, the contents of the parent application being incorporated herein by reference.

FIELD OF INVENTION

This invention relates to the production of stretch plastic film.

BACKGROUND OF INVENTION

Stretch plastic film, commonly known as stretch wrap, has gained substantial acceptance for such uses as warehouse packaging applications where plastic film is stretched around pallets, containers or irregular loads, with a built-in elastic recovery properties of the film constraining the surrounding item(s). A number of plastic materials, such as PVC, LLDPE, LDPE, and EVA/LDPE, are used to produce stretch film for commercial use.

The properties of the stretch film obtained are dependent upon a large number of variables, such as the extrusion process, film thickness, monolayer or multilayer film, cooling rate, blow up ratio and stretch ratio. Currently, extensive research work is being carried out in industrial laboratories to improve the properties of stretch film, such as balance of peel-lap cling, tensile strength, tear resistance, transparency, etc.

Most stretch films are produced by a cast film process. However, in such a process, orientation is effected only in the machine direction. Tensile strength can be improved if the film is produced by a blown film process. Also, due to the inherent nature of the cast film process, edge trimming is essential and this can lead to kinks on the edges, thereby making the film vulnerable to tear. Tear properties can also be improved using a blown film process.

To improve the above mentioned properties of stretch film and increase production yield, a blown film process for stretch film was developed and is the subject of parent U.S. Pat. No. 6,162,318. In the invention disclosed and claimed in the parent application, a bubble formed from blown film is blocked intentionally when collapsed by using a relatively low tower height, i.e. a relatively short distance from extrusion die to collapsing frame, blocking meaning that opposed sides of the collapsed bubble become bonded together. The invention described and claimed in the parent application has various advantages but also has certain disadvantages, for example, low bubble stability at very thin gauges which results in reduction in output and also puts a lower limit on final blocked thickness of the film.

It is therefore an object of the invention to provide an improved method for the production of relatively thin stretch plastic film.

SUMMARY OF THE INVENTION

According to the invention, stretch plastic film is formed by extruding suitable plastic material from an annular die as a tubular film, forming the extruded film into a bubble with air entrapped therein by collapsing the tubular film at a predetermined distance from the annular die, causing the temperature of the tubular film when collapsed to be sufficiently high to cause opposite sides of the collapsed film to become bonded together to form a blocked two layer film, and stretching the blocked two layer film to reduce its thickness.

In addition to the advantages of a stretch film produced in accordance with the invention disclosed and claimed in parent U.S. Pat. No. 6,162,318, the present invention enables thin stretch film to be produced by means of a blown film process in which the bubble is relatively thick, with consequent improved bubble stability and hence higher output.

The stretching of the blocked two layer film may be effected by passing the blocked two layer film between a pair of driven stretch/nip rolls rotated at a faster peripheral speed than the speed of the collapsed film at said predetermined distance from the annular die. The blocked two layer film may be passed successively through a plurality of pairs of driven stretch/nip rolls, each subsequent pair of stretch/nip rolls being driven at a faster peripheral speed than the previous pair of stretch/nip rolls.

The blocked two layer film may be stretched by an amount in the range of from about 100 to about 400%, for example from a thickness in the range of from about 20 to about 30 microns to a thickness in the range of from about 10 to about 25 microns.

DESCRIPTION OF THE DRAWINGS

Embodiments of the invention will now be described, by way of example, with reference to the accompanying drawings, of which.

DESCRIPTION OF PREFERRED EMBODIMENTS

The stretch plastic film may comprise a polyolefin, such as polyethylene, and from about 1 to about 8% by weight of polyisobutylene, without any slip or antiblock additives being used. Polyisobutylene (PIB) is used as a cling additive for stretch wrap applications. Polyisobutylene is an elastomer based on aliphatic olefins. Depending on its molecular weight, PIB is partially incompatible with polyethylene for high molecular weight fractions and compatible for low molecular weight components. PIB may be added via a gear pump into the feed throat of the extruder or may be added in a pre-compounded polyethylene concentrate or by directly injecting it into the extruder. A disadvantage of a pre-compounded master batch is that it may stick to the feed throat, resulting in inconsistent feed and hence surging during processing.

After cooling by ambient air (25° C.), the bubble may be collapsed at a relatively low tower height from about 10 to about 15 feet in order to block the film, i.e. to cause opposite sides of the extruded film to become bonded together. Blow up ratios from about 1.2:1 to about 5:1 may be used. A blow up ratio of about 2.5:1 is preferable for down gauging the film down to about 10 microns and hence producing a blocked two layer film with a thickness of from about 20 microns, which may be stretched by 100% to produce a finished film with a thickness of about 10 microns.

Figure 1:
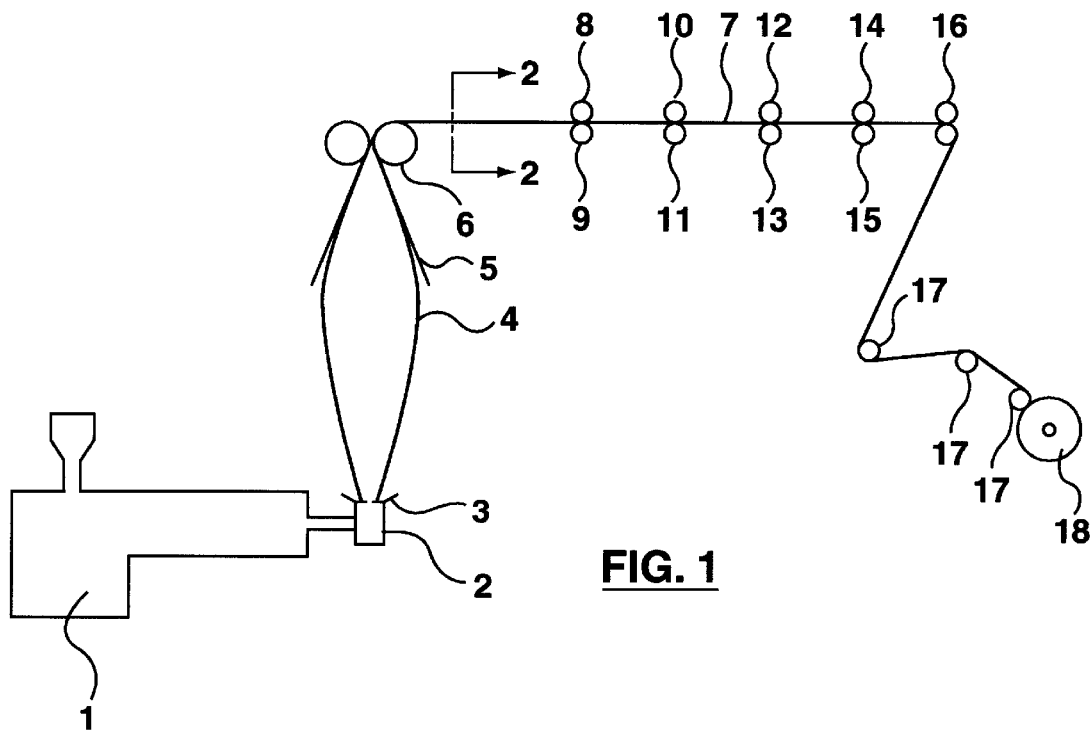
FIG. 1 is a diagrammatic view of a method of producing stretch plastic film in accordance with the invention by means of a blown film process.
Figure 2:
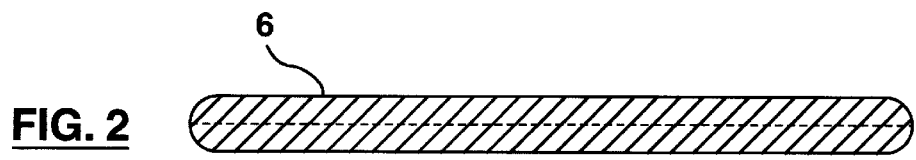
FIG. 2 is a cross-sectional view taken along the line 2—2 off FIG. 1 of stretch plastic film in accordance with the invention.
Figure 3:
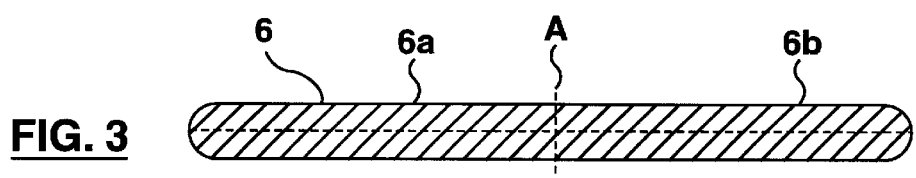
FIG. 3 is a similar view showing how the stretch plastic film of FIG. 2 can be cut along its central longitudinal axis to produce two stretch plastic films each having half the width of the original film.
Figure 4:
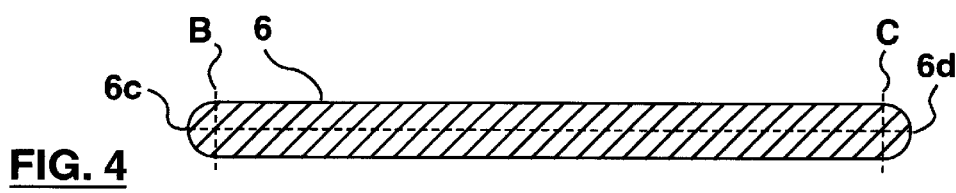
FIG. 4 is a similar view showing how the opposite side edge portions of the stretch plastic film of FIG. 2 can be removed.

Referring to FIGS. 1 and 2 of the drawing, a tubular film 4 of suitable plastic material is extruded by an extruder 1 through an annular die 2 and is rapidly cooled to room temperature by an air ring 3. The film extruded from the annular die 2 proceeds as a bubble 4 in known manner to a collapsing frame 5 and pinch rolls 6. The amount of air in the bubble 4 can be varied to obtain different blowup ratios, and the speed of the pinch rolls 5 can be varied to obtain different stretch ratios. The collapsing frame 5 collapse the bubble 4, and the temperature of the film bubble 4 when collapsed is sufficiently high to cause opposite sides of the bubble 4 to become bonded together, i.e. blocked, and form a blocked two layer film 7.

The blocked two layer film 7 is then passed through four pairs of stretch/nip rolls 8–9, 10–11 12–13 and 14–15. The speed of each pair is independently controlled, with the peripheral speed of the first pair being faster than the peripheral speed of the pinch rolls 6, and the speed of successive pairs being faster than the speed of the previous pair in order to stretch the film 7 by an amount in the range of from about 100 to about 400%. The final stretch film 7 passes through another pair of nip rolls 16, then over idler rolls 17 and onto a winder 18.

Specific examples of the invention will now be described.

EXAMPLE 1

A copolymer, mPE, made by EXXON Chemical Co., under the trade name Exceed 3028, with a melting point of 92° C., a vicat softening point of 80° C., a density of 0.9 g/cc, and a melt index of 1.2 was used in this example. PIB made by Amoco Chemical Co., under the trade name H-100 with an average molecular weight of 920, a density of 0.883 g/cc, a viscosity CS at 99° C. of 196–233 and a specific gravity at 15.6° C. of 0.8899 was added. The PIB (4% wt) was added via a gear pump through the feed throat of extruder 1.

The film extruded from annular die 2 was rapidly cooled by ambient air at 25° C. from an air ring 3, with air being injected into the bubble 4 in known manner at a pressure to biaxially stretch the film four times lengthwise and three times breadthwise simultaneously between the die 2 and the pinch roll 5. The bubble 4 was collapsed and blocked while warm (60° C.) at a nip height of 10 feet by the pinch rolls 5. The film was stretched 200% by the stretch/nip rolls 8–9, 10–11, 12–13 and 14–15 and, after passing through nip rolls 16 and over idler rollers 17, it was wound on surface winder 18. The finished biaxially oriented stretch film had a width of 12 inches and thickness of 10 microns.

EXAMPLE 2

Stretch plastic film was produced in the same manner as in Example 1 except that the polyolefin was LLDPE. This polymer was obtained from Dow Chemical Co. under the trade name DOWLEX 2267A with a vicat softening point of 98° C., a density of 0.917 d/cc and a melt index of 0.85, there being no slip or antiblock additives. The final biaxially oriented stretch film had a width of 18 inches and a thickness of 15 microns.

Other embodiments and examples of the invention will be readily apparent from the forgoing description, the scope of the invention being defined in the appended claims.

What is claimed is:

1. A method of producing stretch plastic film including:

extruding suitable plastic material from an annular die as a tubular film, forming extruded film into a bubble with air entrapped therein by collapsing the tubular film bubble at a predetermined distance from the annular die, causing the temperature of the tubular film when collapsed to be sufficiently high to cause opposite sides of the collapsed film to become bonded together and form a blocked two layer film, and stretching the blocked two layer film to reduce its thickness.

2. A method according to claim 1 wherein said stretching is effected by passing the blocked two layer film between a pair of driven stretch rolls rotated at a faster peripheral speed than the speed of the blocked two layer film at said predetermined distance from the annular die.

3. A method according to claim 2 wherein the blocked two layer film is passed successively through a plurality of pairs of driven stretch/nip rolls, each subsequent pair of stretch rolls being driven at a faster peripheral speed than the previous pair of stretch/nip rolls.

4. A method according to claim 1 wherein the blocked two layer film is stretched by an amount in the range of from about 100 to about 400%.

5. A method according to claim 1 wherein the blocked two layer film has a thickness in the range of from about 20 to about 50 microns and is stretched to a thickness in the range of from about 10 to about 25 microns.

* * * * *